United States Patent
Harnsberger et al.

(10) Patent No.: US 10,651,710 B2
(45) Date of Patent: May 12, 2020

(54) LINEAR TUBULAR MOTOR MAGNETIC SHAFT SLEEVE

(71) Applicant: Moog Inc., East Aurora, NY (US)

(72) Inventors: Gregory M. Harnsberger, West Chester, PA (US); Carl Deirmengian, Media, PA (US); David P. Cardamone, Lansdale, PA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 15/502,707

(22) PCT Filed: Jul. 31, 2015

(86) PCT No.: PCT/US2015/043224
§ 371 (c)(1),
(2) Date: Feb. 8, 2017

(87) PCT Pub. No.: WO2016/028471
PCT Pub. Date: Feb. 25, 2016

(65) Prior Publication Data
US 2017/0229945 A1    Aug. 10, 2017

Related U.S. Application Data

(60) Provisional application No. 62/039,474, filed on Aug. 20, 2014.

(51) Int. Cl.
*H02K 15/03* (2006.01)
*H02K 41/03* (2006.01)
(Continued)

(52) U.S. Cl.
CPC ............... *H02K 15/03* (2013.01); *H02K 1/34* (2013.01); *H02K 41/031* (2013.01); *H02K 2005/1287* (2013.01)

(58) Field of Classification Search
CPC ........ H02K 15/03; H02K 1/34; H02K 41/031; H02K 41/03
(Continued)

(56) References Cited

U.S. PATENT DOCUMENTS 3,015,615 A * 1/1962 Precht .................... G21C 21/10
  228/135
3,151,978 A * 10/1964 Cameron ................ C22C 38/44
  148/326
(Continued)

FOREIGN PATENT DOCUMENTS

WO    03/065554 A1    8/2003

OTHER PUBLICATIONS https://www.appliedthermaltechnologies.com/nadcap/our-validated-nadcap-processes, 2016.*
(Continued)

*Primary Examiner* — Terrance L Kenerly
(74) *Attorney, Agent, or Firm* — Harter Secrest & Emery LLP

(57) ABSTRACT

A method of assembling a shaft of a magnetic motor comprising the steps of providing a plurality of magnets (210), providing a plurality of pole pieces (212), stacking (S11) said magnets and pole pieces to form a subassembly (202) having an outer surface of a first diameter, providing a precipitation hardenable stainless steel sheet material, forming said stainless steel sheet material into a tube (S20), drawing said tube to form a precision tube having an inner surface of a second diameter (S21), said second diameter being greater than or equal to said first diameter, heat treating said precision tube to form a tubular sleeve of a Rockwell C hardness of at least about 40 and a magnetic
(Continued)

permeability of at least about 100 (S22), and inserting said subassembly axially into said sleeve (S30), thereby forming a shaft for a magnetic motor.

16 Claims, 4 Drawing Sheets

(51) Int. Cl.
  *H02K 1/34* (2006.01)
  *H02K 5/128* (2006.01)
(58) Field of Classification Search
  USPC ..................................................... 310/12.18
  See application file for complete search history.

(56) References Cited

U.S. PATENT DOCUMENTS

| 5,144,735 | A | 9/1992 | Stark |
| 5,881,448 | A | 3/1999 | Molnar |
| 7,946,025 | B2 | 5/2011 | Lindberg et al. |
| 2002/0078568 | A1* | 6/2002 | Maggio .............. G03G 15/0928 29/895.3 |
| 2012/0220383 | A1* | 8/2012 | Pittman .................. F01M 13/04 464/170 |

OTHER PUBLICATIONS httpswww.appliedthermaltechnologies.comnadcapour-validated-nadcap-processes, 1961.*
http://www.isibang.ac.in/~library/onlinerz/resources/Enghandbook.pdf (Year: 2004).*
http://www.atlassteels.com.au/documents/Atlas%20Grade%20datasheet%20440C%20rev%20May%202008.pdf (Year: 2008).*
International Search Report and Written Opinion of the International Searching Authority (10 pages) completed Nov. 30, 2015.
AK Steel Corporation: AK Steel Product Data Bulletin 17-7 PH Stainless Steel © 2007 (16 pages).

* cited by examiner

LINEAR TUBULAR MOTOR MAGNETIC SHAFT SLEEVE

TECHNICAL FIELD

The present invention is directed to the construction of permanent magnetic motors, and more particularly to shafts for use in permanent magnetic linear motors.

BACKGROUND ART

Generally speaking, a conventional magnetic motor includes two pieces that move relative to each other. Each of the two pieces includes some means of generating a magnetic field. The interaction between the magnetic fields generated by each of the pieces forces the pieces to move relative to each other. Usually, the magnetic field of at least one of the pieces will be selectively adjusted over time so that, as the relative spatial relationship of the pieces changes over time, the magnetic fields of the respective pieces will continue to interact to continue to activate relative motion in a desired direction.

Usually at least one of the pieces of the magnetic motor will employ one or more electromagnet(s), such as an electromagnetic coil, to generate its magnetic field(s). By using an electromagnetic piece, the timing of current supplied to the electromagnet(s) can be used to control the direction and strength of the magnetic fields with respect to time. By carefully controlling the electromagnetic piece's magnetic field as its counterpart piece moves, the magnetic field will pull and/or push the two counterpart pieces into relative motion. As the counterpart pieces continue in their relative motion, the direction and/or magnitude of the current in the electromagnet(s) can be changed so that the new magnetic field of the electromagnet(s) will continue to force the desired relative motion.

There are various geometries for magnetic motors. One geometry is the rotary magnetic motor. In a rotary magnetic motor, a rotor piece is driven to rotate relative to a stator piece. Another geometry is the linear magnetic motor. In a linear magnetic motor, a shaft member is driven to move linearly (that is, as a straight line translation) with respect to a stator piece.

In one type of linear magnetic motor, an elongated shaft member is at least partially surrounded by the stator and is constrained radially by a bearing to move linearly within the stator. Generally the bearing housing and stator are fixed relative to each other and can therefore be thought of as a subassembly.

FIGS. 1 and 2 show typical prior art linear magnetic motor 100, including shaft 102, stator 104 and bearings 106. Shaft 102 generates magnetic fields by virtue of having a series of built-in permanent magnets 110. Stator 104 generates magnetic fields through a series of annular magnetic coils 105. By timing the flow of current in the coils with respect to the position and/or momentum of shaft 102, the interaction of magnetic forces from the shaft and from the stator will actuate the shaft to move. More particularly, the shaft is constrained, by bearings 106, to move linearly in the direction of arrow D.

FIG. 2 shows a more detailed view of shaft 102 and one of the magnetic fields that it generates. Shaft 102 includes sleeve 109, annular, permanent magnet 110, pole pieces 112 and core 114. In this assembly, maximizing the magnetic force on the shaft will tend to advantageously maximize the thrust of the linear motor. In order to maximize the magnetic force on the shaft, the magnetic field of permanent magnet 110 should cause as much magnetic flux density as possible linking stator 104 and shaft pole pieces 112.

There are several variables that control the magnitude of the flux density in the vicinity of the stator. One variable is the strength of permanent magnet 110. For more thrust, the strength of magnet 110 should be increased as much as possible and/or as much as is cost effective (without causing saturation).

As shown in FIG. 2, another variable that has an influence on the flux density is the size of the effective air gap G. As shown in FIG. 2, the effective air gap G in this example is the sum of the actual air gap 108 and the thickness of non-magnetic sleeve 109. Some actual air gap is needed to prevent the shaft from rubbing against the non load-bearing surfaces of the stator poles. On the other hand, decreasing this air gap, without entirely eliminating it, will advantageously cause the field of magnet 110 to have greater flux density in the vicinity of the stator due to the increased proximity between magnet 110 and the stator. As flux density from magnet 110 in the vicinity of the stator increases, increased interaction of the magnetic fields results in increased force on the shaft, increased attendant actuation of the shaft and increased motor thrust.

Yet another variable affecting magnetic flux density in the vicinity of the stator is the flux density located across the effective air gap. As shown in FIG. 2, there are generally three paths A, B, C for the magnetic field of magnet 110. While magnet paths are generally circuits, it is noted that the magnetic "paths" referred to in this document refer to the portion of the magnetic circuit that lies outside of the magnet itself.

Path A passes through sleeve 109, which is part of the effective air gap. Path B passes through actual air gap 108, which is also part of the effective air gap. Path C passes through the stator. Permanent magnets are generally limited in the maximum amount of magnetic flux that they are capable of outputting. For an annular magnet of finite flux output capability, greater magnetic flux along paths A and B reduces the flux available for path C. As explained above, it is flux density of path C (that is, flux that reaches the vicinity of the stator) that contributes to motor thrust.

Sleeve 109 is conventionally made from materials that have a low magnetic permeability. The non-magnetic nature of sleeve 109 works to minimize flux along sleeve 109 though path A. Nevertheless, some relatively small amount of magnetic flux is generally "lost" along path A. To represent this lost flux, a solitary dashed flux line is shown passing along and through the sleeve in FIG. 2. Because only a small fraction of the total flux is lost along path A, a higher portion of the total flux generated by magnet 110 will be directed through path C into the vicinity of the stator.

Because actual air gap 108 is made of air, this potential flux leakage path B has extremely low permeability (the relative permeability of air equals 1.0) and no substantial remanent magnetization. Since the path B leakage flux is small and is primarily a result of sleeve 109, no dashed flux lines are shown along actual air gap 108 at the upper half of FIG. 2.

Sleeve 109 provides a bearing surface to slidably mate with bearing 106 as bearing 106 radially constrains the linear motion of shaft 102. If no sleeve were present, then the permanent magnets and the intermediate pole pieces of shaft 102 would contact the bearing. Because of the limited choice of materials that can be used to make the permanent magnets, and because of physical discontinuities between magnets and pole pieces, the exposed magnets would not generally provide an acceptable bearing surface. This is due to the friction and wear characteristics that a surface of exposed magnets and pole pieces, and any imperfection at the mating surfaces, would have.

Besides providing a relatively smooth and low-friction bearing surface, sleeve 109 also helps provide structural integrity for shaft 102. This can be especially important because the strong permanent magnets 110 can create magnetic attraction toward the stator wall sufficient to deform the entire shaft, absent proper structural support.

BRIEF SUMMARY OF THE INVENTION

With parenthetical reference to corresponding parts, portions or surfaces of the disclosed embodiment, merely for the purposes of illustration and not by way of limitation, a method of assembling a shaft of a magnetic motor is provided comprising the steps of providing a plurality of magnets (210), providing a plurality of pole pieces (212), stacking (S11) said magnets and pole pieces to form a subassembly (202) having an outer surface of a first diameter, providing a precipitation hardenable stainless steel sheet material, forming said stainless steel sheet material into a tube (S20), drawing said tube to form a precision tube having an inner surface of a second diameter (S21), said second diameter being greater than or equal to said first diameter, heat treating said precision tube to form a tubular sleeve of a Rockwell C hardness of at least about 40 and a magnetic permeability of at least about 100 (S22), and inserting said subassembly axially into said sleeve (S30), thereby forming a shaft for a magnetic motor.

The method may further comprise the step of providing an elongated core (S10) and the step of stacking said magnets and pole pieces may comprise the step of stacking said magnets and pole pieces along said core in an alternating fashion to form said subassembly having said outer surface of said first diameter. The step of stacking said magnets and pole pieces along said core in an alternating fashion to form a subassembly having an outer surface of a first diameter may comprise the steps of stacking said magnets and pole pieces along said core in an alternating fashion and then machining said stacked magnets and pole pieces to cause said subassembly outer surface to have said first diameter. The step of forming said stainless steel sheet material into a tube may comprise the steps of rolling said sheet material and welding longitudinally extending opposed edges of said rolled sheet material together. The step of drawing said tube to form a precision tube may comprise the steps of cold drawing said tube a first time through a first die and over a first mandrel and cold drawing said tube a second time through a second die and over a second mandrel to said second diameter. The heat treatment may be substantially pursuant to SAE standard AMS-2759/3. The precision tube may be heat treated to form a tubular sleeve of a Rockwell C hardness of at least about 45 and a magnetic permeability of at least about 115.

The method may further comprise the steps of applying epoxy between said magnets and pole pieces before said magnets and pole pieces are stacked about said core and allowing said epoxy to set after said subassembly has been formed. The method may further comprise the steps of temporarily distorting at least one of said subassembly and sleeve so as to permit said subassembly to be inserted axially into said sleeve and allowing each of said subassembly and sleeve that had been temporarily distorted to move back toward its original undistorted shape so as to form a tight interference fit between said subassembly and sleeve. The step of temporarily distorting at least one of said subassembly and said sleeve may include the step of temporarily cooling said subassembly to temporarily reduce said first diameter (S13). The step of allowing each of said subassembly and sleeve that had been temporarily distorted to move back toward its original undistorted shape may include the step of allowing such temporarily-cooled subassembly to warm to room temperature. The step of temporarily distorting at least one of said subassembly and sleeve may include the step of temporarily heating said sleeve to temporarily increase said second diameter (S23). The step of allowing each of said subassembly and sleeve that had been temporarily distorted to move back toward its original undistorted shape may include the step of allowing such temporarily-heated sleeve to cool to room temperature. The method may further comprise the steps of applying epoxy between the sleeve and the subassembly and allowing the epoxy to set after inserting the subassembly axially into the sleeve.

In another aspect, a shaft for a magnetic motor is provided comprising an elongated core (214), a plurality of magnets (210), a plurality of pole pieces (212), a subassembly comprising said magnets and said pole pieces stacked along said core in an alternating fashion (202) and having an outer surface of a first diameter, a stainless steel tubular sleeve (209) having a Rockwell C hardness of at least about 45 and a magnetic permeability of at least about 115, said stainless steel sleeve having inner surface of a second diameter, said second diameter being greater than or equal to said first diameter, and said subassembly disposed in sleeve.

The shaft may further comprise a stator (204) operatively arranged such that said shaft moves linearly relative to said stator.

DETAILED DESCRIPTION OF THE PREFERRED EMBODIMENTS

Figure 1:
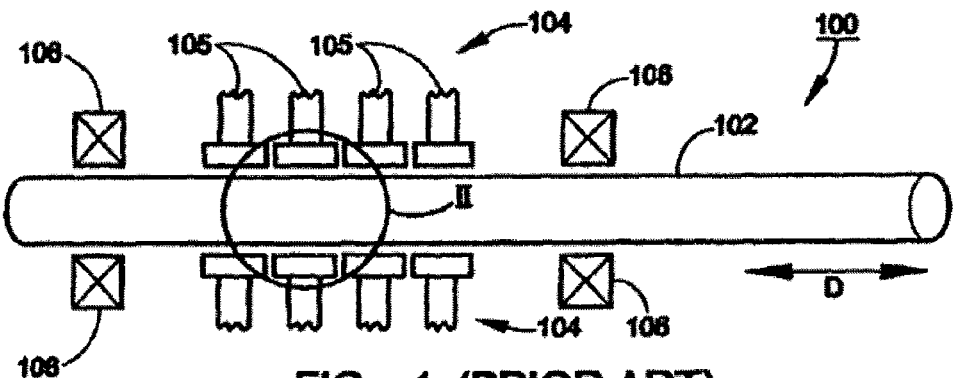
FIG. 1 is side schematic view of a prior art magnetic linear motor.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly"

generally refer to the orientation of a surface relative to its axis of elongation, or axis of rotation, as appropriate.

"Bearing surface layer" refers to any bearing surface conventional now, or to be developed in the future, including, but not limited to bearings permitting mutual linear motion of components, bearings permitting mutual linear translational motion of components, bushing geometry bearings, and ball bearing geometry bearings. "Bearing surface layer" does not imply that the bearing has a discrete surface layer; for example, a standard ball bearing would have a bearing surface layer (because its balls do have surfaces which can be conceptually viewed as thin surface layers) even if the balls are uniform and do not have any sort of coating sleeve, or other type of discontinuity defining a discrete layer.

"First magnet" and "second magnet" refer to any component that generates one or more magnetic dipoles. Magnets include, but are not limited to, permanent magnets and electromagnets.

"Magnetic permeability" refers to the ratio of the magnetic flux density in a material to the magnetizing force producing it, referenced to the value for a vacuum. The permeability referred to is as tested, as applicable, according to ASTM A 342 "Standard Test Methods for Permeability of Feebly Magnetic Materials" or ASTM A-772-89 "Test Method for AC Magnetic Permeability of Materials Using Sine Current."

"Magnetic saturation" refers to that degree of magnetization force where a further increase in magnetization force produces no significant increase in the magnetic flux density (permeability) in a specimen.

The term "shaft" includes, but is not limited to, cylindrical shafts, shafts of polygonal cross-section and shafts without a uniform cross-section. It is further noted that a shaft does not need to be cylindrical in order to define a radial direction or a lengthwise direction.

To the extent that the definitions provided above are consistent with ordinary, plain and accustomed meanings (as generally evidenced, in alia, by dictionaries and/or technical lexicons), the above definitions shall be considered supplemental in nature. To the extent that the definitions provided above are inconsistent with ordinary, plain and accustomed meanings (as generally evidenced, inter alia, by dictionaries and/or technical lexicons), the above definitions shall control. If the definitions provided above are broader than the ordinary, plain and accustomed meanings in some aspect, than the above definitions will control at least in relation to their broadening aspects.

Figure 3:
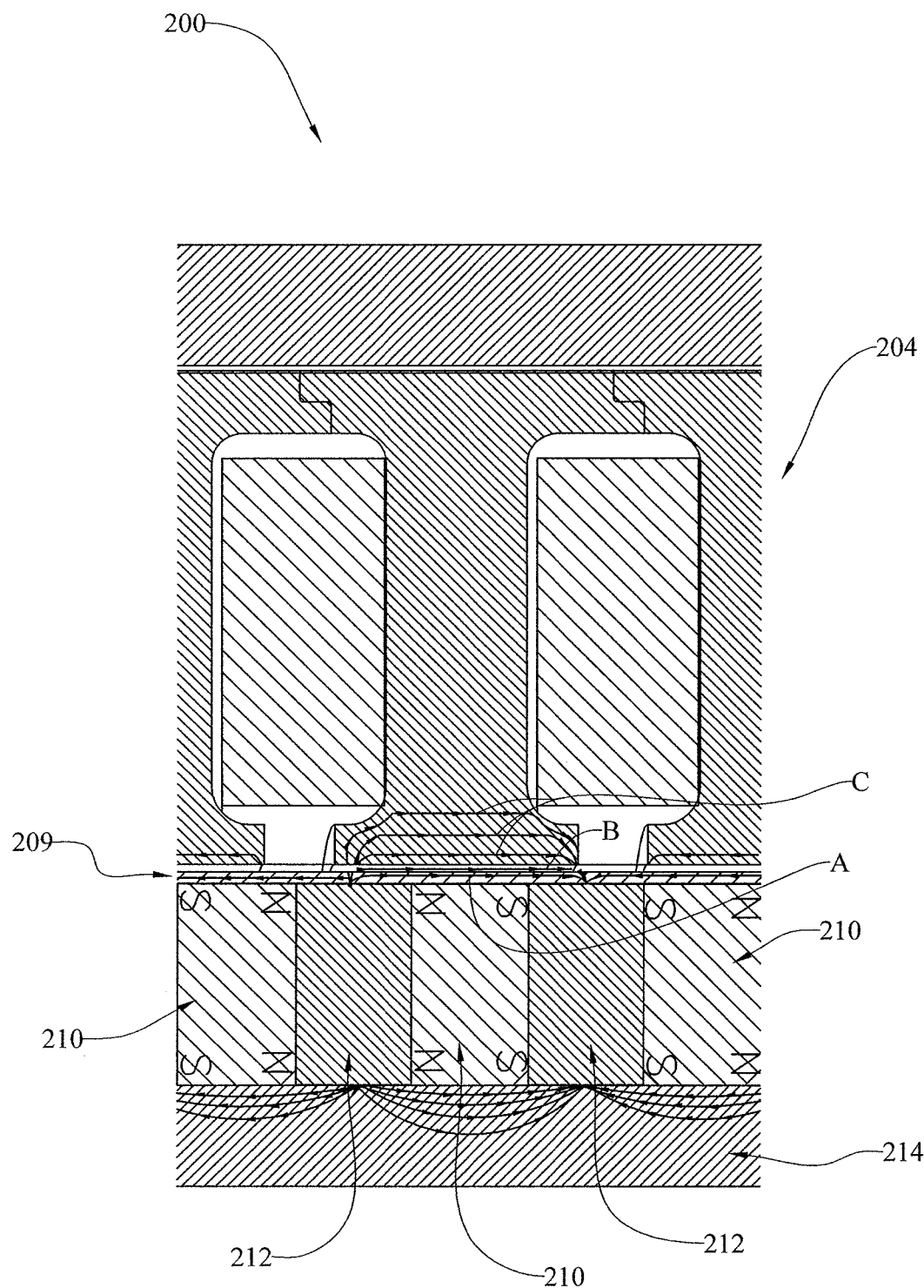
FIG. 3 is a partial cross-section view of an first embodiment of the improved magnetic linear motor.
Figure 4:
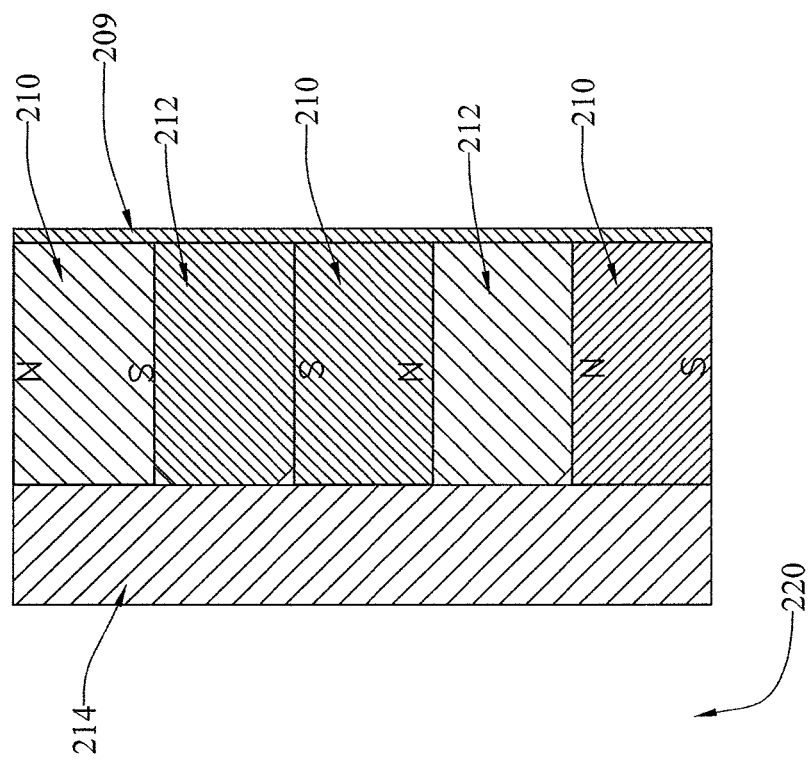
FIG. 4 is an enlarged cross-sectional view of the shaft shown in FIG. 3.
Figure 4:
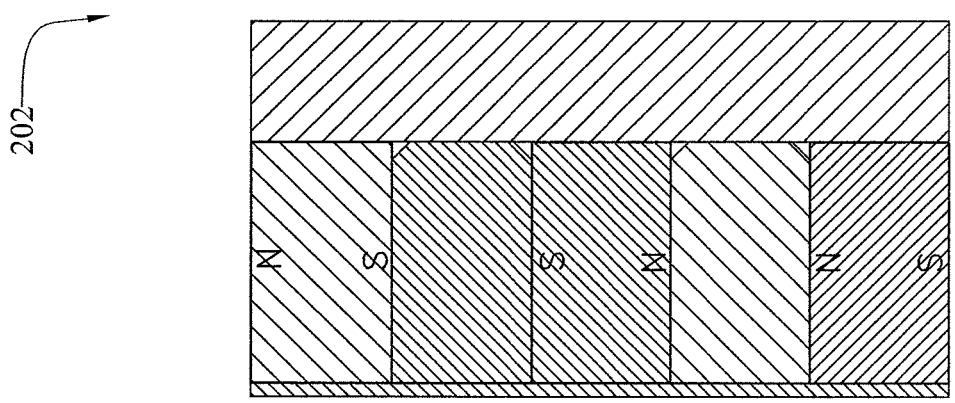

Referring now to the drawings, an improved linear magnetic motor shaft assembly is provided, an embodiment of which is generally indicated at 202. As shown in FIGS. 3 and 4, magnetic motor assembly 200 includes stator 204, sleeve 209, annular permanent magnets 210, pole pieces 212 and hollow tubular core 214 having central passage 220. Stator 204 is similar to prior art stator 104.

Core 214, annular permanent magnets 210, pole pieces 212 and shaft sleeve 209 are assembled to form shaft 202. Core 214 provides structural support and may be made hollow or solid. Core 214 has a low magnetic permeability (e.g., magnetic permeability of approximately 1.0).

Permanent magnets 210 are similar to prior art magnets 110. Pole pieces 212 (and pole pieces in the stator) serve to make the motor doubly salient by concentrating magnetic flux. In order to focus the flux, pole pieces 212 preferably have a magnetic permeability above 1000. For example, the pole pieces may be made from mild steel, silicon iron BFM, 1018 steel, 4130 steel or low carbon 1008 steel. Preferably the pole pieces are approximately of the same axial length as magnets 210. This way the magnetic profile of the shaft will vary in a smooth, sinusoidal fashion. When shaft 202 has a smooth, sinusoidal profile it is easier to achieve constant thrust as the motor moves under the influence of the controlled, varying magnetic field of the electromagnets of stator 204. This is especially true when stator 204 applies 3-phase AC power to its electromagnets.

Figure 5:
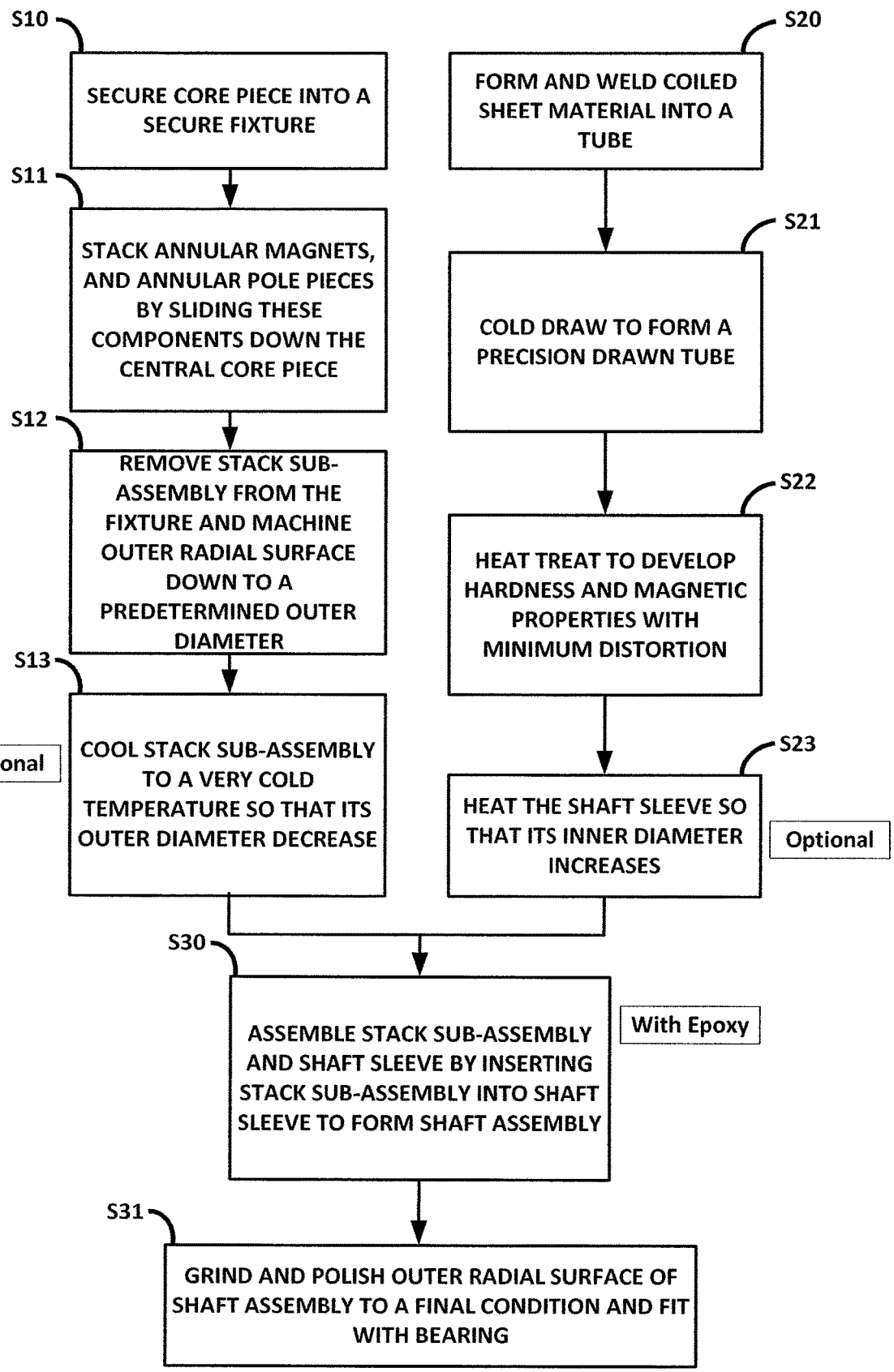
FIG. 5 is a flowchart of a first embodiment of a method of forming the magnetic motor shaft assembly shown in FIG. 4.

Motor 200 is manufactured with some important differences from conventional magnetic motors, especially with respect to shaft 202 and sleeve 209. FIG. 5 is a flowchart of a first embodiment method of assembling shaft 202.

At step S10, the core piece (preferably tubular or solid) is bolted into an appropriate fixture. Because of the powerful, high energy magnets that are to be stacked around the core piece, the fixture must be very secure. For example, the core piece may be locked into a stainless steel nut. In this embodiment, the core piece is also non-magnetic.

At step S11 annular magnets and pole pieces are stacked around the core piece to make a stack sub-assembly. More particularly, magnets and pole pieces are stacked directly around the core in alternating fashion. The magnets are preferably oriented so that the poles of consecutive magnets are oriented in opposite directions on an alternating basis (as is conventional).

Preferably, (unset) epoxy is disposed between the adjacent ends of the annular magnets and pole pieces. Preferably, this is accomplished by bathing the magnets and/or pole pieces in epoxy immediately prior to stacking them around the core. Because the pole pieces are tightly toleranced to fit closely around the core piece, the annular magnets will be coaxially centered precisely about the core piece. The epoxy helps keep the magnets, which are not as tightly toleranced, coaxially centered. As an alternative, pairs made of one annular magnet and one core piece may be epoxied prior to insertion of the core piece. If epoxy is used, then the epoxy should be allowed to set after the stack subassembly is completed. Also, a top nut may be used to clamp the stack in the axial direction while the stack is setting.

At step S12, the stack sub-assembly is removed from the fixture and the outer radial surface of the stack is machined down so that the stack subassembly has a predetermined outer diameter.

After machining, in order to prepare the stack sub-assembly for assembly with the shaft sleeve, in step S13 the stack sub-assembly may optionally be cooled to a cold temperature (e.g., as cold as −300 degrees Fahrenheit in liquid nitrogen) so that the outer diameter of the stack sub-assembly decreases due to the thermal treatment.

Separately from the preparation of the stack sub-assembly, the shaft sleeve is previously formed for the ultimate assembly of the shaft. At step S20, a coil of UNS S17700 (17-7) grade stainless steel sheet material, in the annealed condition, is provided. The material is a precipitation hardening chromium-nickel-aluminum stainless steel. The sheet material is formed by a continuous rolling and seam welding operation, forming a tube. As the tube comes off of the roller and welding machine, the tubes are cut to a manageable length. At this point, the tubes are prepared for cold drawing by cleaning, acid etching, and dry lubricating. Then, the ends of the tube are pointed to assist in the initial draw process. Pointing is achieved by reducing both the ID and OD for a small segment at the end of the tube which tapers back to the original size.

At step S21, the welded tube is cold drawn to form a precision drawn tube. In particular, die and mandrel tool sets are manufactured which determines the ID and OD of the drawn tube. A die and mandrel set are mounted to the tube drawing bench and the tube is then cold drawn through the die and over the mandrel, ultimately stretching the length of the original tube while shrinking the original OD and ID closer to the desired final dimension. A secondary draw is then performed to the tubes with the second die and mandrel set in order to further reduce the OD and ID to the final desired dimensions. The tubes are flooded with oil during both drawing processes.

At step S22, the precision tube is heat-treated to SAE standard AMS-2759/3 to develop hardness and magnetic permeability. In particular, the tube is hung vertically during the operation to assist in maintaining straightness and roundness of the tube. During the heat treat process, the tube is heated to 1750° F.±15° F., and held at this temperature for at least ten minutes. Then, the tube is air-cooled down to room temperature. Within an hour of reaching room temperature, the tube should start to be cooled down to −100° F.±10° F. The tube is then held at this temperature for 8 hours. After this, the tube is air-warmed to room temperature. Then, the tube is heated to 950° F.±10° F. for one final heating process. Once at temperature, the tube should be held there for 60 minutes, and then it is air cooled to room temperature. This heat treat process should achieve desirable hardness, strength, and magnetic properties.

At this juncture, the inner diameter of the shaft sleeve should be equal to or smaller than the outer diameter of the stack subassembly, unless an interference fit is not desired. The inner diameter of the shaft sleeve is fixed by the drawing, heat treating and straightening process. The drawing process will yield a consistent tube dimension but the straightening on rollers and heat treatment will change that final dimension. Such changes must be predicted and accounted for in creating the die used in the drawing process in order to achieve the desired final dimensions.

At step S23, the shaft sleeve may optionally be heated (e.g., to 275 degrees Fahrenheit) so that the shaft sleeve and its inner diameter expand. Care should be taken to not overheat the sleeve and thereby adversely impact its acquired hardness and magnetic permeability. When the stack sub-assembly is cooled and the shaft sleeve is heated, then the stack subassembly is inserted (at step 30) into the inner diameter of the shaft sleeve because of the respective thermal contraction and expansion. This process must occur very quickly as the dissimilar temperature of the two subassemblies will quickly equalize such that the clearance gained by the temperature differential will evaporate and assembly will no longer be possible. The completed assembly should no longer be significantly heated beyond the temperature at which permanent demagnetization of the magnets will occur.

The optional thermal treatment allows the stack assembly to be inserted in the shaft sleeve. As an alternative method, only the stack assembly may be thermally treated (that is, cooled), or only the shaft sleeve may be thermally treated (that is, heated). However, the thermal treatments must effect sufficient, temporary geometrical adjustment so that the stack assembly will fit within the shaft sleeve. Of course, after the thermal treatment is over, the shaft sleeve and stack assembly will shrink and expand toward their respective pre-thermal treatment sizes until the clearance between them is zero. At that time the pressure at the surface between the stack assembly and the sleeve will begin to increase and continue to do so until their temperatures are fully equalized. However, care must be taken to assure an interface pressure not too great to crack the sleeve or split the welded seam.

As a further alternative, rather than an interference fit and heat treatment as described above, a small clearance fit may be used and the sleeve and stack assembly glued together with an epoxy. Preferably, (unset) epoxy is disposed on the outer surface of the stack assembly. The stack assembly is then inserted axially into the sleeve and the epoxy is allowed to harden.

At step S31, the outer radial surface of the shaft assembly is ground and polished to a final condition and fitted to the bearing to make a linear motor. In this embodiment, the outer surface is polished to a surface finish of 8 units Ra, which improves wear characteristics with the bearing.

This assembly process described above and the materials used in such process are counter to those taught in the prior art and provided unexpectedly higher performance. Using this process, a precision thin-walled tubular sleeve having uniform wall thickness and straightness can be formed. In the mill or annealed state, the stainless steel is non-magnetic, formable and weldable. After forming, welding and cold-drawing to precision tube dimensions, the described processing and heat-treatment allows the steel to develop martensitic properties, becoming magnetic (having increased magnetic permeability) with a high hardness suitable for a bearing surface. In addition, the assembly process provides a number of significant cost advantages. Among other things, gun drilling is eliminated, secondary grinding is reduced and machining time is dramatically decreased. In addition, heating and cooling for an interference fit is not necessary, but is only optional.

Thus, sleeve 209 is formed from precipitation hardenable UNS S17700 grade stainless steel hardened to Rockwell "C" of at least about 40, preferably at least about 45, and more preferably 48-50. The stainless steel of sleeve 209 is strong, wear-resistant and shapeable. Shaft sleeve 209 can be made thinner and has a relatively large magnetic permeability and magnetically saturates. In particular, stainless steel sleeve 209 has a magnetic permeability of at least about 100, and more preferably a magnetic permeability of greater than about 115. This means that, for a permanent magnet 210 of given strength and coercivity, the density of the magnetic fields will generally increase because of the decreased magnetic reluctance of sleeve 209 which forms a part of the various magnetic paths.

The path A flux density (see FIG. 4) will be large because of the high permeability of sleeve 209. While this is not advantageous, the path C flux density (see FIG. 4) will also increase. This is advantageous because it is the path C flux density that drives the motor. Furthermore, strong, wear-resistant stainless allows sleeve 209 to be made thinner and the effective air gap is decreased. The increased path C flux, the thinner sleeve and the decreased effective air gap provide advantages that outweigh the fact that somewhat increased flux is directed along sleeve 209 through path A.

Whether sleeve 209 will magnetically saturate under the influence of the magnetic field of magnets 210 will depend upon: (1) the strength of the magnets; (2) the geometry of the shaft (e.g., sleeve thickness); (3) magnetic permeability of the shaft sleeve material; and (4) magnetic saturation properties (e.g., rated saturation flux density, $B_{sat}$) of the shaft sleeve material. Given a typical high thrust magnetic linear motor geometries (e.g., sleeve thickness of 0.015 to 0.02 inches), the shaft sleeve will saturate at magnetic permeabilities of approximately 2.4 or greater. Conventional shaft sleeves do not magnetically saturate. In this embodiment, the magnetic field from permanent magnets 210 is strong enough that sleeve 209 will magnetically saturate.

Figure 2:
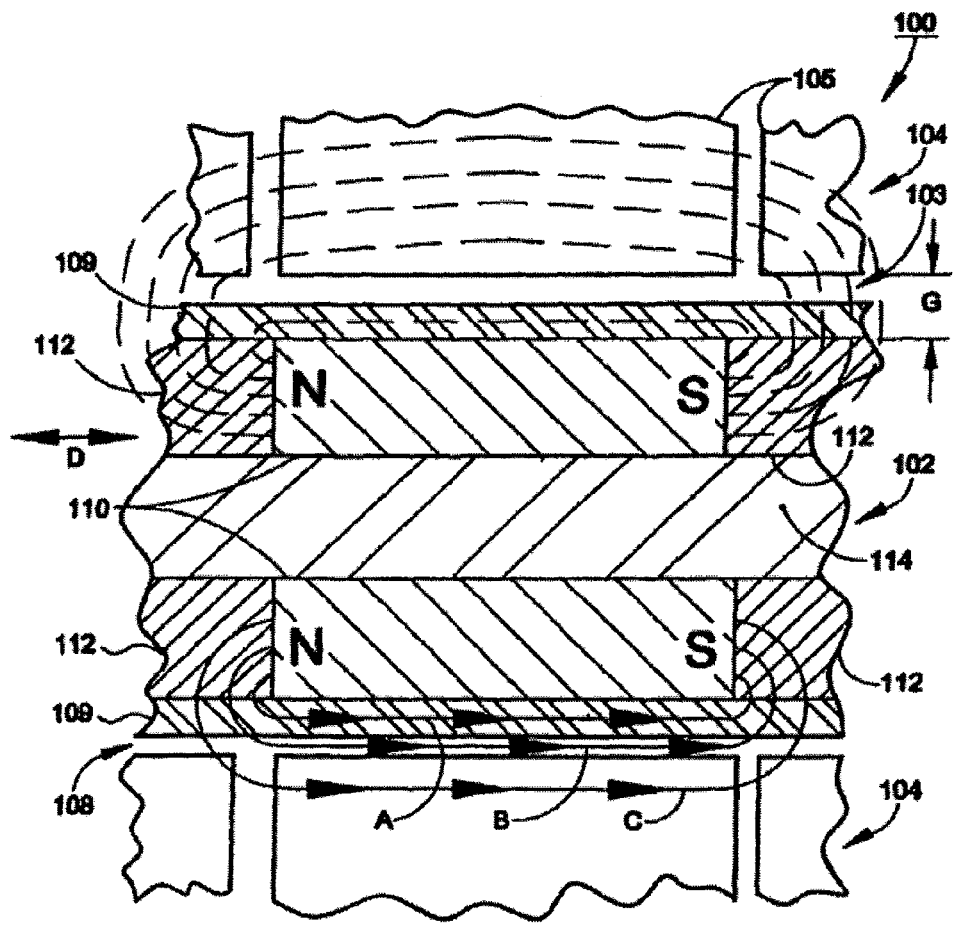
FIG. 2 is a more detailed and partial cross-sectional view of the prior art linear magnetic motor of FIG. 1.

By comparing prior art FIG. 2 with FIG. 3, it is observed that the magnetic field of the annular magnet of both prior art magnetic motor 100 and magnetic motor 200 is primarily directed along three flux paths A, B and C. More particularly, flux path A is the flux that is directed generally parallel to, and within the body of the respective shaft sleeves 109, 209. Flux path B is directed generally parallel to the respective shaft sleeves, but is located within the respective actual air gaps, located between the respective outer surfaces of the shafts and the respective inner surfaces of the stators. Flux path C represents the flux that reaches the vicinity of the respective stators 104, 204, and flux path C therefore represents the effective flux that helps to actuate and deactuate the respective motors. On the other hand, the flux of paths A and B do not serve a useful function, and this flux is wasted.

Despite the similarity of the geometry of the three flux paths A, B, C of the respective motors, the total flux and the pattern of flux density is quite different in prior art motor 100 than it is in motor 200. Flux path A will have a much larger density in motor 209 than in corresponding prior art motor 100. This is because of the high magnetic permeability of sleeve 209. The high permeability of sleeve 209 is very conducive to induced magnetic fields, so there is a much higher flux density than if a conventional sleeve, having a magnetic permeability of less than 2, was employed. In other words, path A of motor 200 is a relatively low reluctance path that will draw a relatively high proportion of the total flux put out by the annular magnet.

Moving now to flux path B, there is not a great flux density over path B in either motor 100 or motor 200. In each case, the actual air gap is fairly small and the air has a small permeability and therefore flux path B represents a high reluctance path. However, there are two differences between the air gap in motor 100 and motor 200, namely the actual air gap difference and the effective air gap difference. Because of the novel method of manufacture of shaft 202, the effective air gap in motor 200 may be made smaller than the corresponding effective air gap in motor 100, such that the effective air gap approaches the actual air gap. In motor 100, the permeability of the shaft sleeve is relatively small (generally the conventional sleeve permeability is approximately 1.0, which is the value of air or a vacuum). This low, conventional permeability of motor 100 significantly adds to the magnetic reluctance of flux path C. In fact, because the conventional low permeability sleeve of motor 100 has a reluctance that is approximately the same as that of equal distance of air, the sleeve can be considered as part of the air gap for the purpose of determining the magnetic reluctance of flux path C. Thus in motor 100 the effective air gap equals the actual air gap plus the shaft sleeve thickness. In motor 200, the effective air gap will tend to be much smaller. This is because motor 200 has high magnetic permeability shaft sleeve 209. In this embodiment, the effective air gap would be very close to equal to the actual air gap. Therefore, motor 200 would has a much smaller effective air gap than comparable embodiments of motor 100.

Moving now to the path C component in the pattern of flux density of motor 200, path C is the flux that is present in the vicinity of the stator, radially outward of the actual air gap. As mentioned above the flux of path C is the portion of the magnetic field that interacts with the magnetic fields of the stator to make the shaft and stator move (and stop moving) relative to each other. The greater the flux density along path C, the greater the thrust of the motor. In motor 200, the flux density along path C is much greater than for comparable prior art motor 100. This is because the total flux from high energy annular magnet 210 is much greater than the total flux put out by comparable, high energy magnet 110. Moving to the portion of path C that runs through the shaft sleeve (in a generally perpendicular direction (see FIG. 3)), the reluctance of this portion of the path is decreased because of the higher permeability materials that are formed on sleeve 209 as described above.

While the presently preferred form of the improved shaft assembly and it's method of manufacture has been shown and described, and several modifications thereof discussed, persons skilled in this art will readily appreciate that various additional changes and modifications may be made without departing from the scope of the invention, as defined and differentiated by the following claims.

What is claimed is:

1. A method of assembling a shaft of a magnetic motor, comprising the steps of:
   providing a plurality of magnets;
   providing a plurality of pole pieces;
   stacking said magnets and pole pieces to form a subassembly having an outer surface of a first diameter;
   providing a precipitation hardenable chromium-nickel-aluminum stainless steel sheet material;
   forming said stainless steel sheet material into a tube;
   drawing said tube to form a precision stainless steel tube having an inner surface of a second diameter, said second diameter being greater than or equal to said first diameter;
   heat treating said precision stainless steel tube so as to increase both a hardness and a magnetic permeability of said precision stainless steel tube to form a stainless steel tubular sleeve of a Rockwell C hardness of at least about 40 and a magnetic permeability of at least about 100; and
   inserting said subassembly axially into said sleeve;
   thereby forming a shaft for a magnetic motor.

2. The method as set forth in claim 1, and further comprising the step of providing an elongated core and wherein said step of stacking said magnets and pole pieces comprises the step of stacking said magnets and pole pieces along said core in an alternating fashion to form said subassembly having said outer surface of said first diameter.

3. The method as set forth in claim 2, wherein said step of stacking said magnets and pole pieces along said core in an alternating fashion to form a subassembly having an outer surface of a first diameter comprises the steps of stacking said magnets and pole pieces along said core in an alternating fashion and then machining said stacked magnets and pole pieces to cause said subassembly outer surface to have said first diameter.

4. The method as set forth in claim 1, wherein said step of forming said stainless steel sheet material into a tube comprises the steps of rolling said sheet material and welding longitudinally extending opposed edges of said rolled sheet material together.

5. The method as set forth in claim 1, wherein said step of drawing said tube to form a precision stainless steel tube comprises the steps of cold drawing said tube a first time through a first die and over a first mandrel and cold drawing said tube a second time through a second die and over a second mandrel to said second diameter.

6. The method as set forth in claim 1, wherein said heat treatment is substantially pursuant to SAE standard AMS-2759/3.

7. The method as set forth in claim 1, wherein said precision stainless steel tube is heat treated to form a tubular sleeve of a Rockwell C hardness of at least about 45 and a magnetic permeability of at least about 115.

8. The method as set forth in claim 1, and further comprising the steps of applying epoxy between said magnets and pole pieces before said magnets and pole pieces are stacked about said core and allowing said epoxy to set after said subassembly has been formed.

9. The method as set forth in claim 1, and further comprising the steps of temporarily distorting at least one of said subassembly and sleeve so as to permit said subassembly to be inserted axially into said sleeve and allowing each of said subassembly and sleeve that had been temporarily distorted to move back toward its original undistorted shape so as to form a tight interference fit between said subassembly and sleeve.

10. The method as set forth in claim 9, wherein said step of temporarily distorting at least one of said subassembly and said sleeve includes the step of temporarily cooling said subassembly to temporarily reduce said first diameter.

11. The method as set forth in claim 10, wherein the step of allowing each of said subassembly and sleeve that had been temporarily distorted to move back toward its original undistorted shape includes the step of allowing such temporarily-cooled subassembly to warm to room temperature.

12. The method as set forth in claim 9, wherein the step of temporarily distorting at least one of said subassembly and sleeve includes the step of temporarily heating said sleeve to temporarily increase said second diameter.

13. The method as set forth in claim 12, wherein the step of allowing each of said subassembly and sleeve that had been temporarily distorted to move back toward its original undistorted shape includes the step of allowing such temporarily-heated sleeve to cool to room temperature.

14. The method as set forth in claim 1, and further comprising the steps of applying epoxy between said sleeve and said subassembly and allowing said epoxy to set after inserting said subassembly axially into said sleeve.

15. A shaft for a magnetic motor, comprising:
an elongated core;
a plurality of magnets;
a plurality of pole pieces;
a subassembly comprising said magnets and said pole pieces stacked along said core in an alternating fashion and having an outer surface of a first diameter;
a chromium-nickel-aluminum stainless steel tubular sleeve precipitation hardened to having a Rockwell C hardness of at least about 45 and a magnetic permeability of at least about 115;
said chromium-nickel-aluminum stainless steel tubular sleeve having an inner surface of a second diameter, said second diameter being greater than or equal to said first diameter; and
said subassembly disposed in said sleeve.

16. The shaft as set forth in claim 15, and further comprising a stator operatively arranged such that said shaft moves linearly relative to said stator.

\* \* \* \* \*